(12) United States Patent
Vahida (10) Patent No.: US 8,976,626 B2
(45) Date of Patent: Mar. 10, 2015

(54) SEISMIC WAVE EMITTING DEVICE FOR MARINE SEISMIC ACQUISITION AND METHOD FOR IMPLEMENTATION THEREOF

(76) Inventor: Behzad Vahida, Saint Michel sur Orge (FR)

(*) Notice: Subject to any disclaimer, the term of this patent is extended or adjusted under 35 U.S.C. 154(b) by 135 days.

(21) Appl. No.: 13/811,923

(22) PCT Filed: Aug. 30, 2011

(86) PCT No.: PCT/EP2011/064915
§ 371 (c)(1),
(2), (4) Date: Jan. 24, 2013

(87) PCT Pub. No.: WO2012/028617

PCT Pub. Date: Mar. 8, 2012

(65) Prior Publication Data

US 2013/0121114 A1    May 16, 2013

(30) Foreign Application Priority Data

Aug. 30, 2010   (FR) ...................................... 10 56847

(51) Int. Cl.
*G01V 1/04* (2006.01)
(52) U.S. Cl.
CPC ........................................ *G01V 1/04* (2013.01)
USPC ......................................................... 367/144

(58) Field of Classification Search
CPC ....................................................... G01V 1/04
USPC ............... 367/142, 144, 173, 153, 16, 17, 18; 181/120, 119, 110, 115, 113, 111
See application file for complete search history.

(56) References Cited

U.S. PATENT DOCUMENTS

| 2,771,961 | A | | 11/1956 | Blake, Jr. | |
| 4,254,480 | A | | 3/1981 | French | |
| 4,298,964 | A | * | 11/1981 | Warnshuis et al. | ........... 367/173 |
| 4,956,822 | A | | 9/1990 | Barber et al. | |
| 5,856,954 | A | * | 1/1999 | Grall | ............................. 367/106 |
| 6,870,795 | B2 | | 3/2005 | Bouyoucos et al. | |
| 8,770,336 | B2 | * | 7/2014 | Vahida et al. | .................. 181/120 |
| 2004/0013041 | A1 | * | 1/2004 | Bouyoucos et al. | .......... 367/144 |
| 2009/0147626 | A1 | * | 6/2009 | Vahida et al. | .................. 367/173 |
| 2013/0112495 | A1 | * | 5/2013 | Vahida et al. | .................. 181/120 |
| 2013/0121114 | A1 | * | 5/2013 | Vahida | .......................... 367/142 |
| 2013/0242694 | A1 | * | 9/2013 | Wu | ................................. 367/16 |

FOREIGN PATENT DOCUMENTS

DE    195 16 727 C1   2/1996

OTHER PUBLICATIONS

International Search Report issued in corresponding International application No. PCT/EP2011/064915, date of mailing Sep. 26, 2011.
Preliminary Search Report issued in corresponding French application No. 1056847 on Apr. 14, 2011.
Written Opinion issued in corresponding French application No. 1056847 on Aug. 30, 2010.

* cited by examiner

*Primary Examiner* — Daniel Pihulic
(74) *Attorney, Agent, or Firm* — Patent Portfolio Builders PLLC (57) ABSTRACT

The invention concerns a device for emitting seismic waves designed to operate by being towed by a vessel. The device of the invention comprises a support of elongated shape; at least one seismic source connected to the support; means to tow the support while holding it in a substantially vertical position.

20 Claims, 7 Drawing Sheets

FIG. 1

(BACKGROUND ART)

FIG. 2

(BACKGROUND ART)

SEISMIC WAVE EMITTING DEVICE FOR MARINE SEISMIC ACQUISITION AND METHOD FOR IMPLEMENTATION THEREOF

The present invention relates to the field of acoustic energy emission devices adapted for marine seismic exploration.

The invention also pertains to a method for using said device.

STATE OF THE ART

One widespread technique for oil or gas prospection comprises a seismic survey of the seafloor. To image the structure of the seafloor, geophysicians use so-called seismic-reflection techniques.

In marine seismics, the most frequent technique comprises towing behind a vessel:
one or more energy sources for the emission of an acoustic wave, and
seismic receivers arranged on cables called streamers.

The source sends an acoustic wave into the water, by setting up a field of compression waves which propagates coherently and downwardly (downward propagation). When the wave field strikes interfaces between geological formations, called reflectors, reflections occur which propagate through the Earth and water as far as the seismic receivers (upward propagation) where they are converted into electric signals and recorded.

Seismic receivers are arranged in such manner and in sufficient number so that, from the recorded signals called traces, it is possible to produce images of the configuration of the geological strata.

Figure 1:
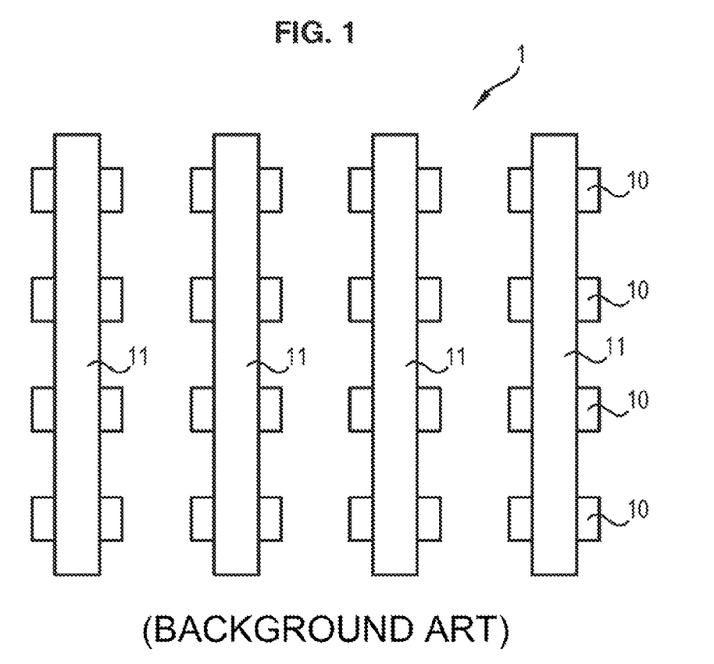
FIGS. 1 and 2 are schematic illustrations, from overhead and side views respectively, of a prior art device.
Figure 2:
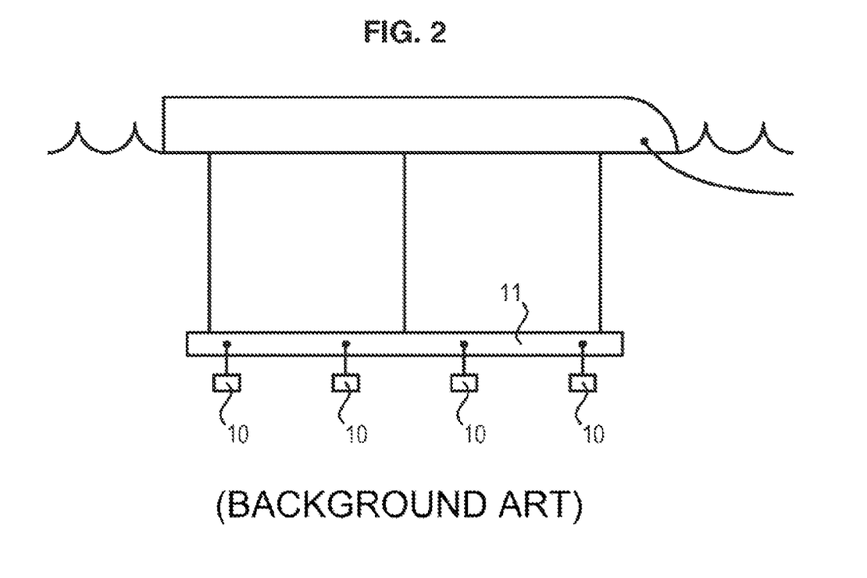

As illustrated in FIGS. 1 and 2, a marine seismic source 1 conventionally comprises a plurality of airguns 10 arranged along a rectilinear sub-array 11 of rigid type (beams) or flexible type (chains).

Each airgun 10 fires a sudden burst of compressed air under high pressure into the water to cause a seismic wave which propagates down into the seafloor.

A rectilinear sub-array such as illustrated is sensitive to cross-currents which, when being towed by a vessel, generates erratic lateral displacements of the airguns and hence uncertainty concerning the positions of the firing points.

The invention sets out to provide a device for emitting seismic waves at sea which ensures satisfactory stability on towing.

DISCLOSURE OF THE INVENTION

According to the invention, a seismic wave emitting device is provided, designed to operate when being towed by a vessel, characterized by the fact that it comprises:
a support of elongated shape;
a marine seismic source connected to the support;
means to tow the support whilst maintaining it in a substantially vertical position.

According to the invention, the support is considered as being in vertical position when the angle between the support and an horizontal plane is comprised between 0 and 30°, preferably between 0 and 20°, more preferably between 0 and 15°, and even more preferably between 0 and 10°.

According to the invention, a method to set in operation a marine seismic source is also provided, characterized by the fact that a support of elongated shape is towed by a vessel, the source being mounted on the support and said support being held in substantially vertical position.

PRESENTATION OF THE FIGURES

Other characteristics and advantages of the device and method will become further apparent from the following description which is non-limiting and solely illustrative, and is to be read in connection with the appended drawings, in which.

DESCRIPTION

One embodiment of a seismic wave emitting device according to the invention is illustrated in FIGS. 3 to 6. The device comprises a supporting structure of elongated shape or mast 100 designed to carry one or more marine seismic sources. In the illustrated embodiment, the device comprises two sources generally designated 200, 300 and positioned on the mast 100 at respective positions spaced apart in the longitudinal direction of the mast.

Figure 3:
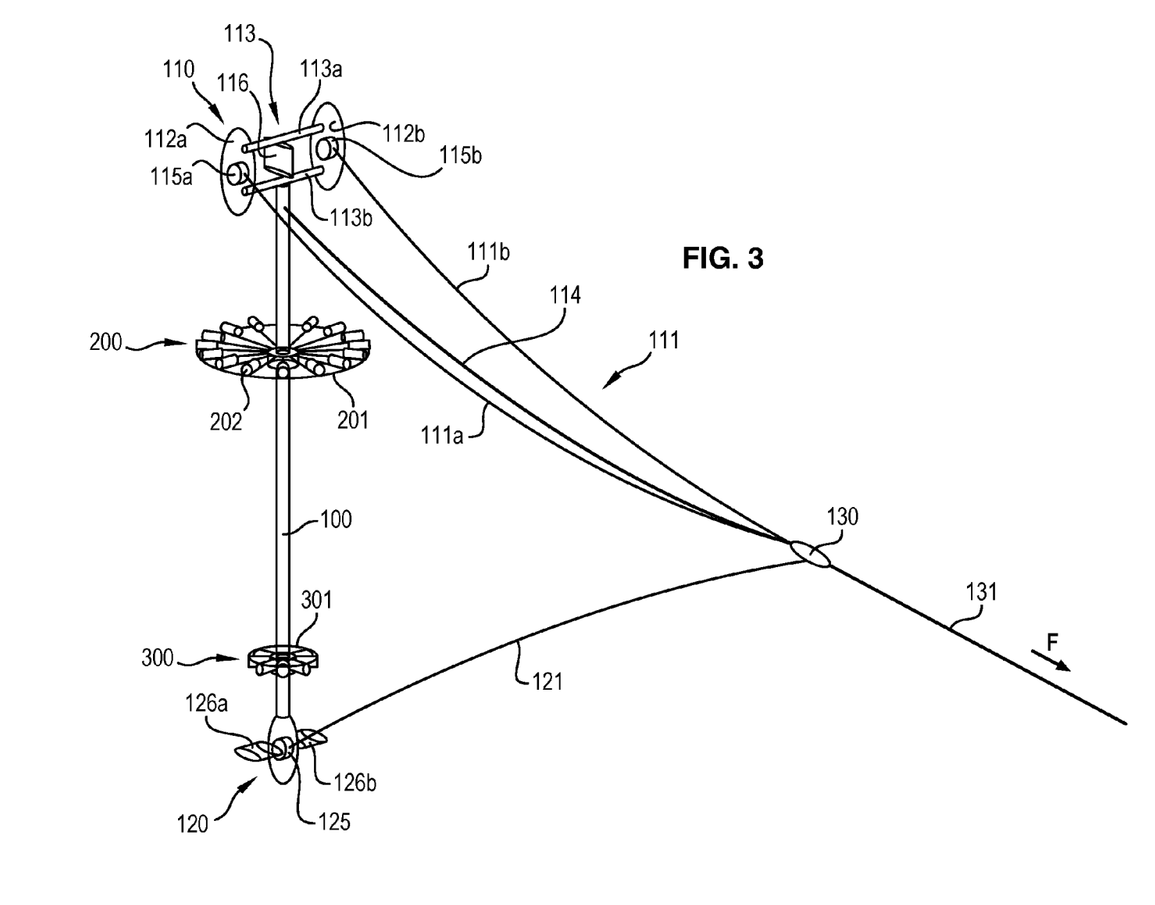
FIGS. 3 to 5 are perspective and overhead views respectively of one embodiment of a device according to the invention, in deployed position.
Figure 4:
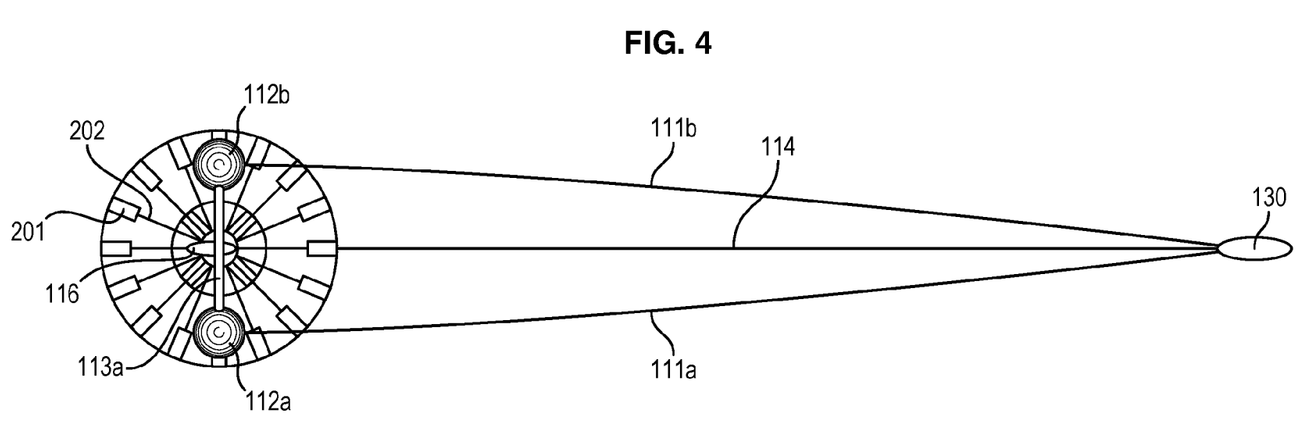
Figure 5:
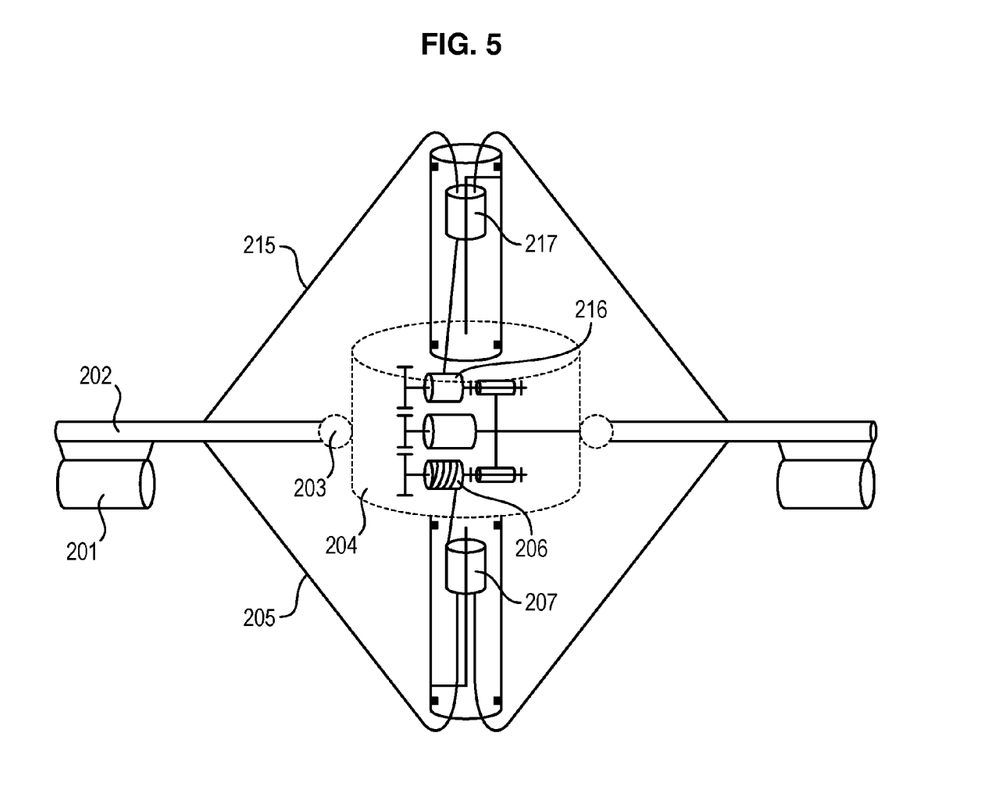

The device comprises means allowing the mast 100 to be towed by a vessel, not illustrated, and keeping it in a substantially vertical position as shown in FIGS. 3 to 5. In the remainder hereof the terms "upper" and "lower" will be used with reference to the vertical position of the mast 100 illustrated in FIGS. 3 and 4 and the term "transverse" with reference to the direction of towing by the vessel indicated in FIG. 3 by the arrow F.

These means comprise means to hold in the mast 100 in vertical position, including:
a float assembly 110 located at the upper end or close to the upper end of the mast 100;
a lower ballastable compartment 120 located at the lower end or close to the lower end of the mast 100.

These means also comprises means for towing by the vessel, including a link assembly 111 linked to the float assembly 110 or to the upper end of the mast 100, and a link element 121 linked to the lower compartment 120.

The float assembly 110 can be fabricated in several manners.

Figure 6:
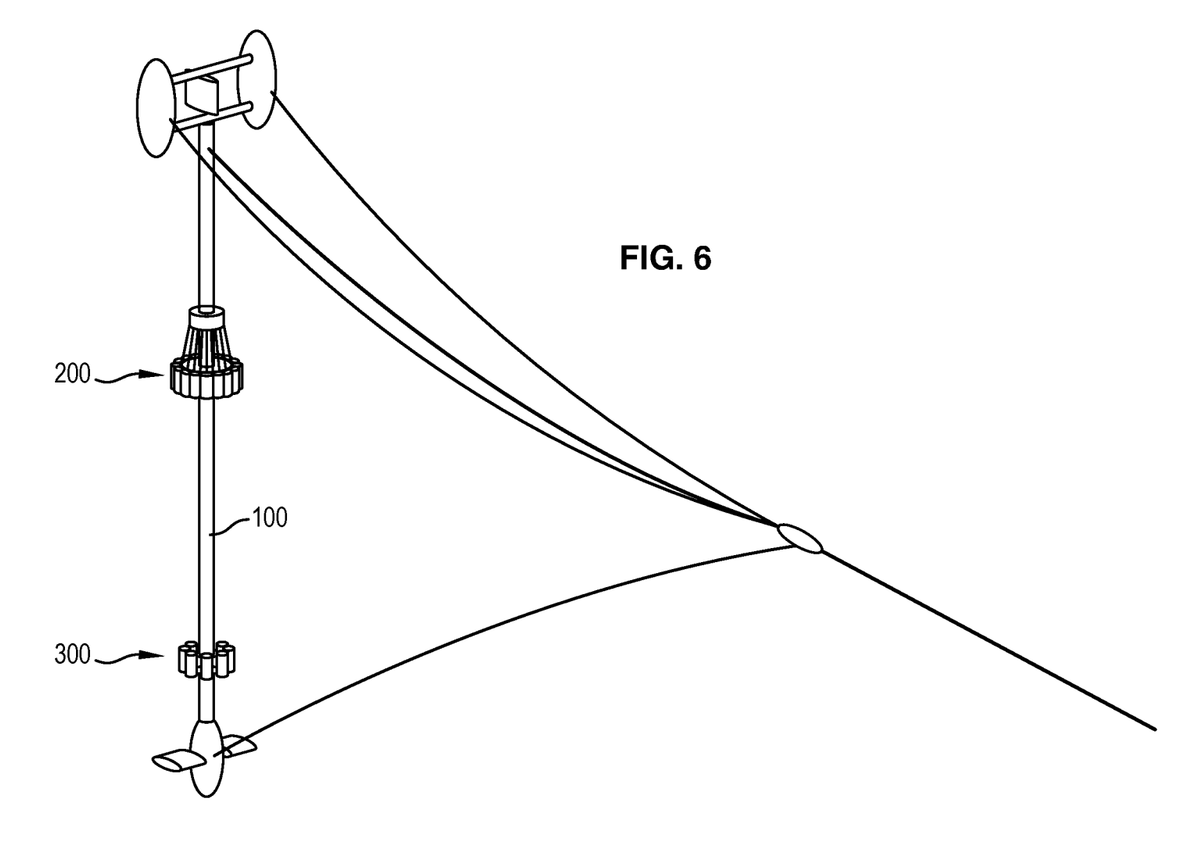
FIG. 6 shows this device in retracted position.

The embodiment illustrated here is designed to promote the navigational stability of the device both in the substantially vertical deployed position and in the substantially horizontal retrieval position illustrated in FIG. 6. According to this embodiment, the float assembly 110 comprises two floats 112a, 112b mounted symmetrically on either side of the mast 100 in a transverse plane relative to the direction of towing indicated by the arrow F. The floats 112a, 112b are fixed to a rigid support 113, globally oriented along the aforesaid plane, which in the illustrated example comprises two parallel bars, an upper bar 113a and a lower bar 113b, attached to the mast 100 at its upper end.

According to the illustrated example of embodiment, the link assembly 111 comprises two mechanical link elements 111a, 111b respectively linked to the floats 112a, 112b, which may be metal cables or synthetic ropes designed for towing, and an umbilical cable 114 to transmit electricity and convey compressed air in the direction of the sources 200, 300 that is connected to the mast 100 in the vicinity of its upper end. Like the link elements 111a, 111b, the connecting element 121 may be a metal cable or synthetic rope designed for hauling.

In the illustrated embodiment, the front ends of the link elements 111a, 111b and connecting element 121 are joined to a junction element 130 of bend stiffener type mounted on the umbilical cable 114 and 131.

In the illustrated embodiment, the connecting element 131 is an umbilical comprising a traction element. The umbilical also comprises the electric conductors and compressed air line needed to operate the seismic sources 200, 300.

One variant of embodiment, not illustrated, consists of connecting the floats 112a, 112b to a single link element connected on its front side to the junction part 130 and on its rear side (side of the mast) to a second junction part, the floats being connected to this second junction part by respective connecting elements of short length.

In another embodiment, not illustrated, the upper part comprises a single main float mounted on the mast 100 so as to form the upper end thereof. Auxiliary floaters of smaller size are connected thereto, either side thereof, whose main function is to stabilize navigation when the device is returned to horizontal position for on-board retrieval. In this embodiment the layout of the link elements connecting this assembly, comprising the main float and its stabilizing floats, to the junction part 130 can be substantially similar to the one described in the previously described embodiment. For manoeuvring of the mast 100 to move it from a vertical position such as shown in FIG. 6 to a substantially horizontal position adapted for on-board retrieval illustrated in FIG. 6, or reciprocally for operational deployment, means are provided that are arranged to modify the length of the link elements connecting the junction part 130 to the float assembly 110 and to the lower compartment 120 respectively. These means may comprise motorized winches, suitably mounted on the float assembly 110 (winches 115a, 115b) and on the lower compartment 120 (winch 125), and on which the ends of the link elements are wound. In the illustrated example of embodiment comprising two floats 112a, 112b, each of the floats carries a winch 115a; 115b, on which the respective ends of the link elements 111a, 111b are wound. These winches are provided with means allowing their operation to be controlled from the vessel by instructions transmitted via the umbilical 114 or, as a variant, by remote control.

In the illustrated example of embodiment, the device is also equipped with lateral piloting means. These means comprise a rudder 116 for navigational assistance mounted at the upper end of the mast 100. The rudder 116, better visible in FIG. 4, is mounted as is conventional so that its neutral position is oriented in the towing direction and so that it is fully immersed during towing. The piloting means may also comprise elements mounted on the lower end of the mast 100. In the illustrated example of embodiment, stabilization fins are provided 126a, 126b fixed to the lower compartment 120, either side thereof, and are arranged substantially in a plane transverse to the axis of the mast 100, hence substantially horizontal in the position shown in FIG. 3.

The mast 100 can be fabricated in different manners provided it has the desired rigidity and floatability, and that it is capable of receiving electric cables and air lines needed to operate the sources 200, 300 and to actuate the lateral piloting members and aforementioned winches. This structure may be watertight, or it may have water inlets.

Figure 7:
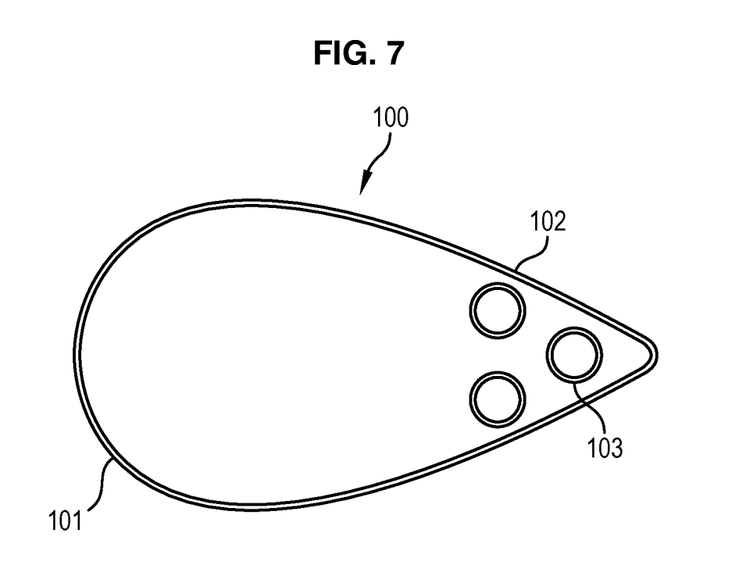
FIG. 7 illustrates a variant of embodiment of an element of the device.
Figure 8:
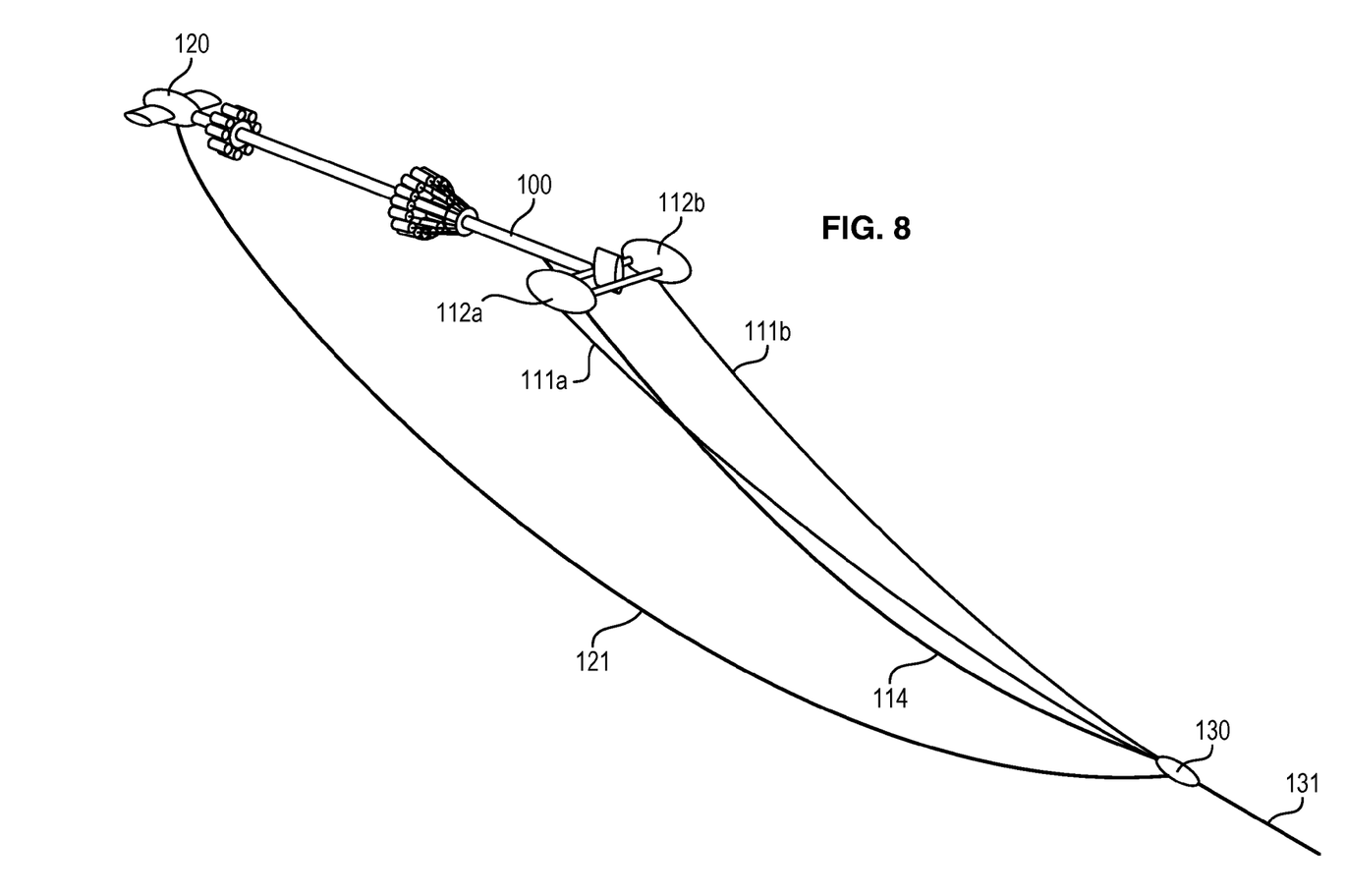
FIG. 8 illustrates the same device at the time of its retrieval.

Additionally, the mast may have an outer circular cross-section as illustrated in FIG. 4. However, it is also possible to envisage a non-circular cross-section optimized for hydrodynamic entry such as illustrated in FIG. 7. Said cross-section typically comprises a substantially semi-circular forward part 101 and a profiled rear part 102 with a decreasing cross-section to minimize turbulence. It is also possible, for comparable results, to envisage a tubular structure with circular cross-section to whose rear part a profiled structure of decreasing cross-section is attached. FIG. 7 illustrates tubular elements 103 housed inside the mast and parallel to the axis thereof, intended to receive electric conductors and a compressed air line. Supporting members, not illustrated, are provided to hold the elements 103 in position inside the mast. Stiffener elements can also be provided inside the mast to ensure the desired rigidity of the structure.

The mast can also act as support for other types of components such as hydrodynamic appendages, sensors or even turbines generating electricity.

The geometry of the above-described device, with a mast 100 to support the sources that is held in vertical or substantially vertical position, offers advantageously compact architectural possibilities for the sources and notably geometries with symmetry of revolution about the mast 100.

The embodiment illustrated therefore comprises sources 200 and 300 having a geometry with symmetry of revolution about the longitudinal axis of the support 20. More precisely, each of the sources 200, 300 is globally in the shape of a circle centred on the longitudinal axis of the mast 100, and comprises a plurality of compressed air sources or airguns respectively 201, 301, arranged at angle positions regularly spaced apart around the mast 100.

Each of the airguns 201, 301 is mounted at the end of or along a respective support-bar 202, 302 joined to the mast 100. Different modes can be envisaged for mounting the airguns on the support-bars, in which the axis of the airguns can lie in the vertical direction or in the horizontal direction. In this latter position illustrated in the figures, the airguns 201 are oriented radially i.e.

along the longitudinal axis of their associated support-bar.

To allow the supplying of air and electricity to the airguns 201, 301, the support-bars 202, 302 may comprise a recess intended to receive electric cables and an air supply line.

The support-bars 202, 302 can be joined to the mast 100 via hinges. In that case, the support-bars are capable of being moved between a retracted position (FIG. 4) in which the support-bars lie substantially parallel, and a deployed position (FIG. 3) in which the support-bars are arranged in one same plane substantially orthogonal to the longitudinal axis of the mast 100 and form a star pattern. For instance in the retracted position, the support bars can be alternately positioned above and under the plane orthogonal to the longitudinal axis of the mast. This allows limiting the dimensions of the device in the retracted position.

In the embodiment illustrated in FIGS. 3 to 5, the mode in which the support-bars 202, 302 are moved can be compared with that of the ribs of an umbrella. This also facilitates the retrieval of the device on-board the vessel, for example to replace a faulty airgun or when the seismic acquisition operation is completed.

To enable movement of the support-bars 202, 302 between the retracted and deployed positions, various means can be envisaged.

One means which can be envisaged is illustrated in FIG. 5. FIG. 5 only shows source 200 but evidently the same type of means would be provided for source 300. It can be seen in FIG. 5 that the support-bars 202 carrying the airguns 201 are connected by hinges 203 to a central structure such as a caisson 204 mounted around the mast 100, so that each support-bar 202 is able to pivot in its radial plane. Connecting cables 205, 215 are provided, connecting the centre of the support-bars 202 to length-adjustment members mounted in the caisson 204 either side of the source, these comprising motorized pulleys 206, 216 for example, respectively connected to junction members 207, 217 positioned inside the mast 100 either side of the caisson 204, to which the assembly of connecting cables 205 (resp. 215) is connected. The adjustment members can be actuated to modify the length of the assembly of the connecting cables 205 lying on one side of the source in one direction, and the assembly of connecting cables 215 lying on the other side in the opposite direction, so as to move the ends of the support-bars 202 and hence the airguns in the desired direction. The connecting cables 205, 215 also fulfil a geometric stabilizing role for the support-structures consisting of all the assembly of hinged support-bars and circumferential connecting elements. The radiating arrangement of these connecting elements generates strutting which limits movements of the support-bars upwards or downwards.

Variants can be envisaged of the description given with reference to FIG. 5. For example, instead of the motorized pulleys 206, 216, it can be considered to use a mechanical device ensuring a movement parallel to the longitudinal axis of the mast 100.

It will be noted that in the illustrated example, the source 200 forms a circle having a larger radius than the source 300, in other words, the airguns 201 forming the source 200 lie further distant from the axis of the mast 100 than the airguns 301 forming the source 300. However, this is only an example given by way of illustration. The choice of dimensions and the distance between the positions of the sources along the longitudinal axis of the mast 100 are a function of the desired characteristics for the seismic waves produced by the sources and for inter-wave interactions. In this respect, the device described above has the advantage of allowing the greatest flexibility in the choice of dimensions. Thus, it allows a source to be provided whose adjacent airguns 201 are sufficiently close to one another (the distance between adjacent canons typically ranging from 0.5 to 1.5 meters), so that the bubbles produced by the guns coalesce to form a single bubble of general annular or toroidal shape.

Once the seismic acquisition is completed, the device must be lifted back on-board the vessel. One first step consists of placing the sources 200, 300 in retracted position using the means previously described. Therefore if these means comprise connecting cables, the length of these cables is modified to control the retracting of the support bars 202, 302.

A second step entails bringing the device back towards the surface of the water. To do so, it is possible to inject compressed air into the lower compartment 120 located at the lower end of the mast 100 for deballasting thereof. The floatability induced by deballasting the lower compartment 120 induces movement of the lower end of the mast 100 towards the surface of the water. Due to drag force, the movement of the lower compartment 120 occurs naturally towards the rear; the winch 125 incorporated in this compartment is used to unwind the connecting element 121 to allow this movement towards the rear and towards the surface of the water. The stabilization fins 126a, 126b can provide assistance for fine-tuned piloting of this rise to the surface.

The device is therefore moved from a vertical position (in which the mast 100 lies substantially perpendicular to the surface of the water) towards a horizontal position (in which the mast 100 lies substantially parallel to the surface of the water).

Once the device is placed in horizontal position, it is brought back inside the vessel, for example, using conventional hoisting arms mounted on the vessel.

The reader will appreciate that numerous modifications can be made to the invention described in the foregoing without materially departing from the teachings of the present document.

Thus, the distribution, volumes and shapes of the float elements, of the piloting means, of the lower compartment(s), their arrangements and their structural linking modes with the mast can follow different geometries. Similarly, the support structures for the airguns can have different geometries, planar or non-planar, and can be foldable or fixed.

For example, in the embodiment illustrated in FIG. 7, the airguns forming each source are distributed in a circle.

Evidently, the airguns can be distributed in a different pattern, such as an ellipse. This can be achieved with support-bars (202; resp. 302) of same length for a given source, by mounting the airguns on the support-bars at different distances from the mast, the distances being chosen to obtain the desired geometry for the pattern formed by the airguns.

Additionally, the above-described embodiment comprising two sources at different depths is evidently only given as an example. The device may only comprise one source or it may comprise more than two sources, for example three sources located in deployed position at different respective depths.

Also, the axis of the mast 100 may not be strictly vertical; it may be tilted at an angle determined during the deployment of the device during the operational phase, to promote a given orientation for emission of the acoustic waves. This can be obtained by appropriate controlling of the winches 115a, 115b and 125.

The invention claimed is:

1. A device for emitting seismic waves into water designed to operate being towed by a vessel, the device comprising:
   a support mast of elongated shape;
   at least one seismic source connected to the support mast; and
   a link mechanism configured to tow the support mast whilst maintaining it in substantially vertical position,
   wherein the at least one seismic source includes a plurality of compressed air sources attached at a same location on the support mast.

2. The device according to claim 1, wherein the support mast comprises a ballastable part at its lower end and a float assembly at its upper end.

3. The device according to claim 2, wherein the link mechanism comprises a link assembly and a link elements for towing the support mast, the link assembly being connected to a first end of the support mast and the link element being connected to a second end of the support mast, the link assembly and the link element being connected together to a junction element.

4. The device according to claim 1, comprising at least one rudder mounted perpendicularly on the support mast.

5. The device according to claim 1, wherein the plurality of compressed air sources are all arranged at the same location on the support mast to generate a bubble of general annular shape.

6. The device according to claim 1, wherein each compressed air source is attached to a respective support-bar and the support-bars are connected to the same location on the support mast.

7. The device according to claim 6, wherein the support-bars are connected to the support mast via hinges to move the support-bars.

8. The device according to claim 6, wherein the support-bars of each of the compressed air sources are able to be moved between:
   a retracted position in which the support-bars extend globally parallel to one another and parallel to the support mast, and
   a deployed position in which the support-bars form a star pattern and are substantially perpendicular to the support mast.

9. The device according to claim 8, wherein the support-bars extend over a plane in the deployed position.

10. The device according to claim 1, wherein the support mast has a cross-section with a hydrodynamic profile.

11. The device according to claim 1, wherein the support mast comprises a longitudinal recess intended to receive electric cables and an air supply line.

12. A method to set a marine seismic source in operation, the method comprising:
   towing a support mast of elongated shape with a vessel, the source being mounted on the support mast, said support mast being held in a substantially vertical position; and
   generating a bubble with the source,
   wherein the source includes a plurality of compressed air sources attached at a same location on the support mast.

13. The device of claim 1, further comprising:
   another seismic source connected to the support mast,
   wherein the plurality of compressed air sources forming the at least one seismic source are distributed farther from the support mast then air sources forming the another seismic source.

14. The device of claim 1, wherein the plurality of compressed air sources are located on a circle around the support mast.

15. The device of claim 1, wherein the link mechanism includes a link element and a corresponding winch, the link element being attached between an end of the support mast and the vessel.

16. The device of claim 15, wherein the winch is located on the end of the support mast and connected to the link element and it is configured to modify a length of the link element for changing the substantial vertical position to a substantial horizontal position.

17. The device of claim 1, wherein the support mast has a tubular structure configured to receive electric cables.

18. The method of claim 12, further comprising:
   retracting the plurality of compressed air sources so that they are close to the support mast.

19. The method of claim 18, further comprising:
   injecting compressed air into a ballastable part attached at a lower end of the support mast to bring the support mast into a substantially horizontal position.

20. A device for emitting seismic waves into water, the device comprising:
   a mast;
   a plurality of airguns connected to the mast at a given location; and
   a link mechanism configured to tow the mast in water while maintaining it in a substantially vertical position.

* * * * *